Patented May 16, 1933

1,909,162

UNITED STATES PATENT OFFICE

GEORGE BARNHART, OF SALEM, NEW JERSEY, ASSIGNOR TO E. I. DU PONT DE NEMOURS & COMPANY, OF WILMINGTON, DELAWARE, A CORPORATION OF DELAWARE

BLACK SULPHUR COLOR AND PROCESS OF MAKING THE SAME

No Drawing.    Application filed August 20, 1927.    Serial No. 214,453.

This invention relates to the manufacture of sulphur black. More particularly it is concerned with improvements in the process of manufacturing a black dye from nitrophenol compounds by fusing the latter with polysulphides. This case is in part a continuation of application Serial No. 84,680 filed January 29, 1926.

To those skilled in the art it is well known that when certain intermediates, for example, suitable nitrophenols, are heated with sodium polysulphide a product is obtained from which sulphur black may be precipitated and removed by filtration. Even through wide variations in conditions and proportions of materials a sulphur black, varying in yield and quality, may be obtained, but unless certain specific conditions and proportions of materials are rigorously adhered to, the yield will be low and the quality unsatisfactory.

One object of the improved process which, with the resulting product, constitutes the present invention is to obtain a higher yield than that obtainable from the processes at present in use. Another object is to produce a product superior in shade and solubility and free from uncombined sulphur. Still another object is to obtain a mass from the fusion of such a nature that the color may be precipitated therefrom in a form readily lending itself to the production of a relatively dry press cake. Also, the time required during fusion, the power cost incident to the use of air for the precipitation and the time required for effecting precipitation are all considerably lessened by the present process.

These objects are attained by the combination of several novel steps which cooperate to produce a superior product. Among the improvements which characterize the new process is the addition of a thiosulphate to the mass containing the fused mixture of nitrophenol and polysulfide.

Other improvements comprise fusing, under pressure, the charge to which the thiosulfate has been added, preferably under such conditions that at least a portion of the permanent gases formed are allowed to escape. Still another improvement comprises the addition, to the diluted charge, before precipitation of the color, of a compound which will react with the sulfur present as such, or as sodium polysulfide, to form thiosulfate, this compound being preferably a soluble sulfite such as sodium or potassium sulfite or bisulfite. A further improvement comprises precipitating the color with a bisulfite such as sodium bisulfite, instead of with air.

In general, in carrying my preferred process into effect I prepare first a solution of a known quantity of sodium polysulfide, for example, of the composition $Na_2S_4$ to $Na_2S_{4.2}$. This solution is heated to from 90 to 95° C. A suitable intermediate, for example, sodium dinitrophenolate, in a quantity within limits which will be disclosed in the more detailed description below is, also, heated to from 75 to 80° C. The heated intermediate is charged into the hot solution at such a rate as to maintain a temperature of approximately 105° C. without the application of extraneous heat. A vigorous reaction results. After this addition is completed, the heating is continued by means of externally applied heat, the water being allowed to evaporate from the mass until a temperature of 116–117° C. is reached. At this point sodium thiosulphate is added to the fusion, and the evaporation continued until a temperature of 123–126° C. is attained. This concentration and temperature is maintained until the reaction is complete. The color may, of course, be then precipitated in the ordinary manner by blowing the diluted charge with air, but I have now discovered that a more satisfactory precipitation can be effected and a superior product obtained at a lower cost by adding sodium bisulfite to the warm diluted charge. The dye is then filtered off and dried in a vacuum.

Temperatures in the fusion as high as 123° to 126° C. at ordinary pressure are rendered possible by the presence of the thiosulphate which has the effect of raising the boiling point. Also the thiosulphate tends to render the mass mobile. These two factors, high temperature and mobility, combine to facilitate the process of thionation with the result that the reaction not only takes place more speedily, but, also, is more complete. It is for these reasons, apparently, that larger quantities than usual of the polysulfide may be employed in conjunction with the thiosulphate.

In addition to adding thiosulfate to the fusion mass, I may also carry out the thionation under pressure, preferably applying the pressure at the point where the temperature has reached about 125° C. By this means the fusion temperature may be still further increased, say to 130 to 150° C., or even higher.

I have discovered, also, that if, before the precipitation of the dye, I add to the diluted charge a compound which will react with the sulfur present as such, or as polysulfide, to form a water soluble thiosulfate, I can still further reduce the free-sulfur content of the finished black. As examples of such compounds adapted for use in this connection I may mention caustic soda, sodium or potassium sulfite, or sodium bisulfite, the latter salt being preferred. Obviously if sodium sulfite is added, it may be employed in sufficient quantities to perform in one operation the double function of reducing the free-sulfur content and precipitating the finished black.

In order that my process may be disclosed in detail, actual embodiments thereof are furnished below. It is to be understood that these examples are purely illustrative, and that I am in no way limited thereby to the particular conditions or reagents specified.

Example 1

One part (by weight) of the sodium salt of dinitrophenol, said part being in the form of a 30 to 35% paste or slurry, is made up (this may be the mass obtained when dinitrochlorbenzene is hydrolyzed and contains not over ¼% of free sodium hydroxide) in a vessel which is arranged to discharge into a jacketed kettle. Into the kettle is charged 1.65 to 1.80 parts of sodium polysulphide of the composition $Na_2S_4$ to $Na_2S_{4.2}$ in form of a 45-50% solution. The sodium dinitrophenolate is heated to 75-80° and the polysulphide to 90-95° before starting the addition of the phenolate. This addition is made gradually and is controlled by the temperature and violence of the reaction. During the addition the mass is agitated and the temperature is allowed to rise to 103-106° C. from the heat of the reaction. After the addition is complete, heat is applied to the jacket and the charge evaporated until a boiling point of 116-117° C. is obtained, when 0.6 to 0.7 of a part of sodium thiosulphate crystals are added and the evaporation continued until a temperature of 123-126° C. is obtained, which temperature is maintained until comparison with the product of a standard fusion indicates that the reaction is complete. The charge is then diluted and precipitated with air, filtered off, and dried in the usual manner.

Example 2

The thionation is made as in Example 1, but, to the warm diluted charge, about 0.25 parts of sodium bisulfite is added to precipitate the dye, which is then filtered and dried.

Example 3

The thionation is made as in Example 1, but, to the warm diluted charge, 0.4 parts of sodium sulfite are added to combine with the sulfur present as such, or as polysulfide; the dye is then precipitated with air, filtered and dried.

Example 4

The thionation is made as in Example 1 up to the time when the temperature reaches 125° C. The reaction kettle is then closed and sufficient heat is applied to generate pressure and to raise the temperature to 135° C. During this latter period the permanent gases are allowed to escape through a relief valve, maintaining the pressure at 10 to 15 lbs. per square inch. The charge is held at this temperature until the reaction is complete. It is then diluted, and while the mass is at a temperature of 60 to 75° C., 0.25 parts of sodium bisulfite are added. After stirring a short time the precipitated black is filtered off, washed and dried.

Although I have mentioned sodium dinitrophenolate particularly, there are many other compounds which might be employed without departing from the spirit of my invention. For example, the dinitrophenols, trinitrophenols, mononitrophenols and their derivatives which upon fusion with polysulphides give sulphur black, or dinitrohydroxy-diphenylamines are all adapted for such use.

The quantity of thiosulphate which may be employed with satisfactory results is also susceptible of considerable variation. Depending somewhat upon the particular intermediate employed, the quantity may range between 0.5 and 2.5 parts as compared to the original quantity of intermediate.

By this improved process it is possible to obtain a high yield of color of unusual brightness, solubility and freedom from uncombined sulphur. Moreover, the time required for thionation is shortened and, since a relatively dry press cake is obtained upon filtration, the cost of drying and tendency to dull during drying are both lessened.

It will be evident to a chemist skilled in the art that, instead of adding the sodium thiosulphate as such to the fusion, the sodium thiosulphate may be added prior to the fusion or formed in situ. For example, free sulphur and sodium sulphite may be added to the heated mass in such proportions as to produce the thiosulphate in proper quantities within the heated mass.

I claim:
1. In the process of manufacturing sulphur black which comprises effecting the thionation of a nitrophenol compound, which compound upon heating with sodium polysulphide yields crude sulphur black, the step of adding sodium thiosulphate to the heated mass.

2. The process of manufacturing a black dye from nitro-hydroxy-compounds of the benzene series, which compounds upon heating with polysulphides give crude sulphur black, which process comprises heating a mixture of the nitro-hydroxy-compound with the polysulphide to approximately 116° C. and adding to the hot mixture a quantity of sodium thiosulphate.

3. The process of manufacturing a black dye from nitro-hydroxy-compounds of the benzene series, which compounds upon heating with polysulphides give crude sulphur black, which process comprises heating a mixture of the nitro-hydroxy-compound with the polysulphide to approximately 116° C. and adding to the resulting fused mass sodium thiosulphate in such quantity as to raise the boiling point of the fusion to at least 120° C.

4. The process of manufacturing a black dye from nitrophenol compounds which are adapted upon heating with polysulphides, to give crude sulphur black which comprises heating to at least 115° C. a mixture of the nitrophenol compound and polysulphide, adding sodium thiosulphate to the resulting fused mass and then heating the mass to from 120 to 130° C.

5. The process of manufacturing a black dye from nitrophenol compounds which are adapted upon heating with polysulphides to give crude sulphur black, which process comprises heating a mixture of 1 part of the nitrophenol compounds with 1.65 to 1.80 parts of sodium polysulphide to at least 115° C. and adding thereto sodium thiosulphate in such quantity as to raise the boiling point of the fusion to at least 123° C.

6. The process of manufacturing a black dye from nitrophenol compounds which are adapted upon heating with polysulphides to give crude sulphur black, which process comprises heating a mixture of 1 part of the nitrophenol compounds with 1.65 to 1.80 parts of sodium polysulphides to at least 115° C. adding thereto between 0.5 and 2.5 parts of sodium thiosulphate and continuing to heat the mixture to a temperature of at least 123° C.

7. The process of manufacturing a black dye which comprises heating a mixture of 1 part of sodium dinitrophenolate with 1.65 to 1.80 parts of sodium polysulphide to at least 115° C., adding thereto between 0.5 and 2.5 parts of sodium thiosulphate and continuing to heat the mixture to a temperature of at least 123° C.

8. A sulphur black obtainable by a process comprising heating a nitrophenol compound with sodium polysulphide and sodium thiosulphate to 123° C., said black being free from uncombined sulphur.

9. A sulphur black free from uncombined sulphur and having the properties of a black obtainable by heating to at least 123° C. a mixture of one part of a nitrophenol compound adapted upon heating with polysulphides to give sulphur black, 1.65 to 1.80 parts of sodium polysulphide and 0.5 to 2.5 parts of sodium thiosulphate, diluting with water and precipitating.

10. A sulphur black free from uncombined sulphur and having the properties of a black obtainable by heating to at least 123° C. a mixture of one part of sodium dinitrophenolate in the form of a 30 to 35% paste, 1.65 to 1.80 parts of sodium polysulphide and 0.5 to 2.5 parts of sodium thiosulphate, diluting with water and precipitating.

11. The process of manufacturing a black dye from nitro-hydroxy-compounds of the benzene series, which compounds upon heating with polysulphides give crude sulphur black, which process comprises heating a mixture of the nitro-hydroxy-compound with the polysulphide to approximately 116° C. and continuing the heating of the resulting fusion in the presence of sodium thiosulphate in such quantity as to raise the boiling point of the fusion to at least 120° C.

12. In the process of manufacturing sulphur black by the thionation of a nitrophenol compound with sodium polysulphide, the step which comprises carrying out the thionation under pressure greater than atmospheric while releasing at least a portion of the permanent gases formed.

13. In the process of manufacturing sulphur black by the thionation of a nitrophenol compound with sodium polysulphide, the steps of (1) adding sodium thiosulphate to the fused charge, and (2) carrying out the thionation under pressure greater than atmospheric.

14. In the process of manufacturing sulphur black by the thionation of a nitrophenol compound with sodium polysulphide, the steps of (1) carrying out the thionation under pressure greater than atmospheric, and (2) adding sodium bisulphite to the diluted charge to precipitate the color.

15. In the process of manufacturing sulphur black by the thionation of a nitrophenol compound with sodium polysulphide, the steps of (1) adding sodium thiosulphate to the fused charge, (2) carrying out the thionation under pressure greater than atmospheric, and (3) adding sodium bisulphite to the diluted charge to precipitate the color.

16. In the process of manufacturing sulphur black by the thionation of sodium-dinitro-phenolate with sodium polysulphide, the step comprising adding sodium bisulphite to the diluted charge in amount sufficient to react with the sulphur present as such, or as polysulphide, and to effect precipitation of the color.

17. The process of manufacturing a black dye from nitro-hydroxy-compounds of the benzene series, which compounds upon heating with polysulphides give crude sulphur black, which process comprises heating a mixture of the nitro-hydroxy-compound with the polysulphides to fusion, adding sodium thiosulphate to the fused mass, heating further under pressure until the reaction is completed, diluting with water, adding a compound adapted to convert the sulphur present in uncombined form or as sodium polysulphide to soluble form and precipitating the final dye with sodium bisulphite.

18. A sulphur black obtained by maintaining a mixture of a nitro-phenol compound with sodium polysulphide in a fused state in the presence of sodium thiosulphate and under pressure to effect thionation, and thereafter adding sodium bisulphite to the diluted product to precipitate the color.

19. A sulphur black having the properties of a black obtainable by heating to at least 123° C. a mixture of a nitrophenol compound with sodium polysulphide and sodium thiosulphate, diluting with water and precipitating.

20. A sulphur black having the properties of a black obtainable by heating to at least 123° C. a mixture of a nitrophenol compound with sodium polysulphide and sodium thiosulphate, diluting with water and precipitating with a soluble sulphite.

21. A sulphur black having the properties of a black obtainable by a process comprising heating a mixture of the nitro-hydroxy-compound with the polysulphides to fusion, adding sodium thiosulphate to the fused mass, heating further under pressure until the reaction is completed, diluting with water, adding a compound adapted to convert the sulphur present in uncombined form or as sodium polysulphide to soluble form and precipitating the final dye with sodium bisulphite.

22. A sulphur black obtainable by a process comprising heating a nitrophenol compound with sodium polysulphide under pressure while releasing at least a portion of the permanent gases.

23. The process of manufacturing a black dye which comprises heating a mixture of one part of di-nitro-hydroxy-diphenylamine with 1.65 to 1.80 parts of sodium polysulphide to at least 115° C., adding thereto between 0.5 and 2.5 parts of sodium thiosulphate and continuing to heat the mixture to a temperature of at least 123° C.

24. In the process of manufacturing sulphur black by the thionation of a nitrophenol compound with sodium polysulphide, the step which comprises carrying out the thionation under pressure while releasing at least a portion of the permanent gases formed, said pressure being sufficient to raise the temperature to a point not greater than 150° C.

25. In the process of manufacturing sulphur black by the thionation of a nitrophenol compound with sodium polysulphide, the steps of (1) adding sodium thiosulphate to the fused charge, and (2) carrying out the thionation under pressure, said pressure being sufficient to raise the temperature to a point not greater than 150° C.

26. In the process of manufacturing sulphur black by the thionation of a nitrophenol compound with sodium polysulphide, the steps of (1) carrying out the thionation under pressure, said pressure being sufficient to raise the temperature to a point not greater than 150° C., and (2) adding sodium bisulphite to the diluted charge to precipitate the color.

27. In the process of manufacturing sulphur black by the thionation of a nitrophenol compound with sodium polysulphide, the steps of (1) adding sodium thiosulphate to the fused charge, (2) carrying out the thionation under pressure, said pressure being sufficient to raise the temperature to a point not greater than 150° C., and (3) adding sodium bisulphite to the diluted charge to precipitate the color.

In testimony whereof I affix my signature.

GEORGE BARNHART.